(12) United States Patent
Muraishi

(10) Patent No.: US 8,699,791 B2
(45) Date of Patent: Apr. 15, 2014

(54) IMAGE PROCESSING APPARATUS, METHOD AND STORAGE MEDIUM FOR CONTROLLING MONOCHROMIZATION AND BACKGROUND REMOVAL PROCESSING

(75) Inventor: Masaaki Muraishi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 13/243,770

(22) Filed: Sep. 23, 2011

(65) Prior Publication Data

US 2012/0087577 A1 Apr. 12, 2012

(30) Foreign Application Priority Data

Oct. 6, 2010 (JP) ................................. 2010-226583
Aug. 5, 2011 (JP) ................................. 2011-171975

(51) Int. Cl.
*G06K 9/00* (2006.01)
*G06K 9/34* (2006.01)

(52) U.S. Cl.
USPC ........................................................ 382/163

(58) Field of Classification Search
USPC ......... 382/162–165, 173, 232, 254, 275, 167;
345/419–422, 426, 619–620; 358/1.9,
358/2.1, 3.26, 505, 522
See application file for complete search history.

(56) References Cited

U.S. PATENT DOCUMENTS

| | | | | |
|---|---|---|---|---|
| 5,317,420 A | * | 5/1994 | Kuwahara | 358/463 |
| 6,538,769 B2 | * | 3/2003 | Yoshida et al. | 358/1.9 |
| 6,593,935 B2 | * | 7/2003 | Imaizumi et al. | 345/619 |
| 7,099,041 B1 | * | 8/2006 | Moriya et al. | 358/1.9 |
| 7,692,816 B2 | * | 4/2010 | Kawamoto et al. | 358/1.9 |
| 2007/0030504 A1 | | 2/2007 | Kawamoto | |
| 2008/0186518 A1 | | 8/2008 | Shoda | |
| 2010/0245952 A1 | * | 9/2010 | Muraishi | 358/505 |
| 2012/0087577 A1 | * | 4/2012 | Muraishi | 382/164 |

FOREIGN PATENT DOCUMENTS

EP 1871088 A2 12/2007
JP 5-063968 A 3/1993

\* cited by examiner

*Primary Examiner* — Amir Alavi
(74) *Attorney, Agent, or Firm* — Canon USA Inc. IP Division

(57) ABSTRACT

In a case where a background removal level is a level for removing a background, monochrome image data is generated based on color image data and then background removal processing is applied to the generated monochrome image data. In a case where the background removal level is a level for not removing the background, the background removal processing is applied to color image data and then monochrome image data is generated based on the image data having underdone the background removal processing.

13 Claims, 20 Drawing Sheets

FIG.11
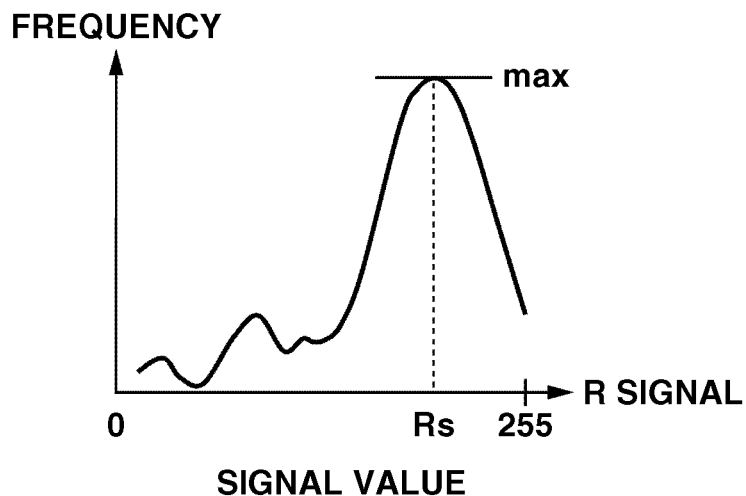
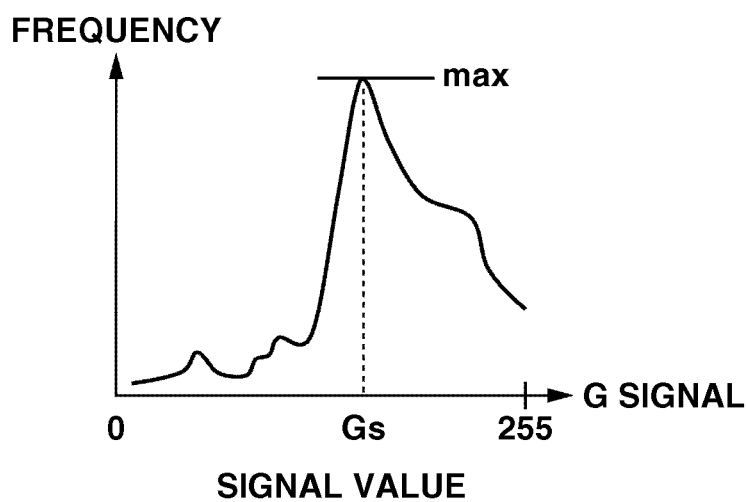
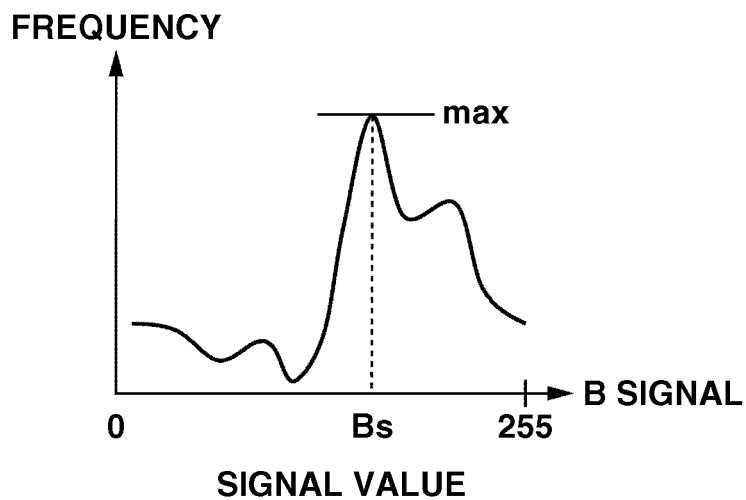

FIG.16A

YELLOW IMAGE INFORMATION
WITH WHITE BACKGROUND COLOR

| BACKGROUND COLOR REMOVAL PROCESSING FIRST ||||||
|---|---|---|---|---|
| | | R | G | B |
| PREPROCESSING PIXEL VALUE | IMAGE INFORMATION LUMINANCE VALUE | 250 | 240 | 140 |
| | BACKGROUND COLOR LUMINANCE VALUE | 250 | 251 | 248 |
| PIXEL VALUE AFTER BACKGROUND COLOR REMOVAL PROCESSING (BACKGROUND COLOR REMOVAL LEVEL = 230) | IMAGE INFORMATION LUMINANCE VALUE | 255 | 255 | 157 |
| | BACKGROUND COLOR LUMINANCE VALUE | 255 | 255 | 255 |
| PIXEL VALUE AFTER MONOCHROMIZATION PROCESSING (RR:GR:BR=3:6:1) | IMAGE INFORMATION LUMINANCE VALUE | 245 | 245 | 245 |
| | BACKGROUND COLOR LUMINANCE VALUE | 255 | 255 | 255 |

FIG.16B

YELLOW IMAGE INFORMATION
WITH WHITE BACKGROUND COLOR

| MONOCHROMIZATION PROCESSING FIRST | | | | |
|---|---|---|---|---|
| | | R | G | B |
| PREPROCESSING PIXEL VALUE | IMAGE INFORMATION LUMINANCE VALUE | 250 | 240 | 140 |
| | BACKGROUND COLOR LUMINANCE VALUE | 250 | 251 | 248 |
| PIXEL VALUE AFTER MONOCHROMIZATION PROCESSING (RR:GR:BR=3:6:1) | IMAGE INFORMATION LUMINANCE VALUE | 233 | 233 | 233 |
| | BACKGROUND COLOR LUMINANCE VALUE | 250 | 250 | 250 |
| PIXEL VALUE AFTER BACKGROUND COLOR REMOVAL PROCESSING (BACKGROUND COLOR REMOVAL LEVEL = 230) | IMAGE INFORMATION LUMINANCE VALUE | 255 | 255 | 255 |
| | BACKGROUND COLOR LUMINANCE VALUE | 255 | 255 | 255 |

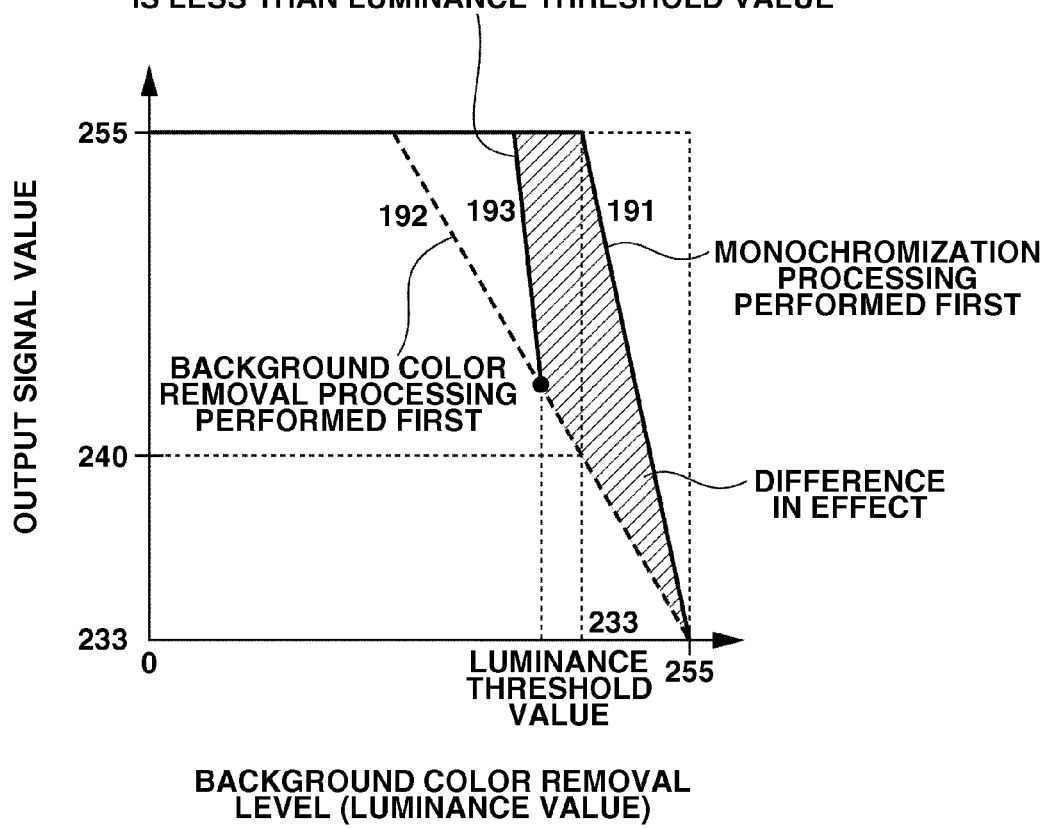

IMAGE PROCESSING APPARATUS, METHOD AND STORAGE MEDIUM FOR CONTROLLING MONOCHROMIZATION AND BACKGROUND REMOVAL PROCESSING

BACKGROUND OF THE INVENTION

1. Field of the Invention

The present invention relates to an image processing apparatus, a method for processing an image, and a program therefor.

2. Description of the Related Art

With an apparatus for scanning a color image using a scanner and outputting a copy of the color image, it is demanded that the output copy is reproduced as faithfully as possible in color reproducibility and tonability of the original color image. However, there is a demand that, if the color image has a background portion, the background portion be reproduced in white on an output copy product.

Japanese Patent Application Laid-Open No. 5-63968 discusses a technique for acquiring a background removal level from histograms of R, G, and B color components and performing nonlinear background removal. This technique makes it possible to constantly reproduce the background portion as a white level of transfer sheet (background removal level) without degrading color reproducibility of a non-background.

In a case of scanning a color image using a color scanner and printing the image in monochrome in a conventional color copying machine, monochromization processing is applied to color image data (for example, RGB image data) generated by the color scanner to generate monochromized image data, and then background removal processing is applied to the monochromized image data. However, there is a case where applying the background removal processing to the monochromized image data causes disappearance of apart of color information (for example, bright colors and fluorescent colors) depending on the method of converting color image data into monochrome image data.

For example, as illustrated in FIG. 16B, yellow text in the RGB image data has RGB values of R:250, G:240, B:140 and the background portion has RGB values of R:250, G:251, B:248. The background removal processing converts RGB values equal to or greater than the background removal level to R:255, G:255, B:255. After the monochromization processing is applied to the RGB image data, yellow text has a luminance value of 233 and a background portion has a luminance value of 250. Then, after the background removal processing (with a background removal level of 230) is applied to the monochromized image data, both yellow text and the background portion have luminance values of R:255, G:255, B:255, causing disappearance of information about yellow text.

To solve the above-mentioned problem, the background removal processing is applied to the RGB image data before the monochromization processing is applied thereto. In this case, however, there is a case where the background portion having large differences in R, G, and B values cannot be removed, possibly degrading the image quality.

For example, as illustrated in FIG. 16A, there is a problem that, after the background removal processing (with a background removal level of 230) is applied to the RGB image data before the monochromization processing is applied thereto, the background having large differences in RGB signal value cannot be removed. For example, when a background has RGB values of R:250, G:240, B:140, the monochromization processing of the RGB image data, after the background removal processing (with a background removal level of 230) is applied thereto, produces RGB values of R:245, G:245, B:245. Japanese Patent Application Laid-Open No. 5-63968 does not discuss the background removal processing performed in a case of scanning a color image using a color scanner and printing the image in monochrome.

SUMMARY OF THE INVENTION

The present invention is directed to an image processing apparatus capable of suitably removing a background of input image data by controlling an execution order of monochromization processing and background removal processing to be applied to the input image data according to a background removal level. The present invention is also directed to an image processing method and a program therefor.

According to an aspect of the present invention, an image processing apparatus includes: an acquisition unit configured to acquire color image data and a background removal level of the color image data; a monochrome image data generation unit configured to generate monochrome image data based on the color image data; a background removal processing unit configured to apply background removal processing to the color image data based on the acquired background removal level; and a control unit configured to, according to the background removal level acquired by the acquisition unit, switch between applying the background removal processing by the background removal processing unit to the monochrome image data generated by the monochrome image data generation unit and generating monochrome image data by the monochrome image data generation unit based on the image data having undergone the background removal processing by the background removal processing unit.

According to another aspect of the present invention, an image processing apparatus includes: an acquisition unit configured to acquire color image data and a background removal level of the color image data; and a processing unit configured to, when the background removal level acquired by the acquisition unit is a level for removing a background, generate monochrome image data based on the color image data and then apply background removal processing to the generated monochrome image data according to the acquired background removal level, and configured to, when the background removal level acquired by the acquisition unit is a level for not removing the background, apply the background removal processing to the color image data according to the acquired background removal level and then generate monochrome image data based on the image data having undergone the background removal processing.

According to yet another aspect of the present invention, an image processing apparatus includes: an acquisition unit configured to acquire color image data and a background removal level of the color image data; and a processing unit configured to, when the background removal level acquired by the acquisition unit is less than a predetermined threshold value, generate monochrome image data based on the color image data and then apply background removal processing to the generated monochrome image data according to the acquired background removal level, and configured to, when the background removal level acquired by the acquisition unit is equal to or greater than the predetermined threshold value, apply the background removal processing to the color image data according to the acquired background removal level and then generate monochrome image data based on the image data having undergone the background removal processing.

According to exemplary embodiments of the present invention, the execution order of the monochrome image generation processing and the background removal processing is controlled according to the background removal level, so that removing a background of an image and reproducing color information of the image can be switched according to the background removal level.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 11 illustrates exemplary histograms according to the second exemplary embodiment of the present invention.

FIGS. 16A and 16B illustrate an exemplary effect of processing according to the exemplary embodiments of the present invention.

FIG. 19 illustrates an exemplary effect of processing according to the exemplary embodiments of the present invention.

DESCRIPTION OF THE EMBODIMENTS

Various exemplary embodiments, features, and aspects of the invention will be described in detail below with reference to the drawings.

Figure 1:
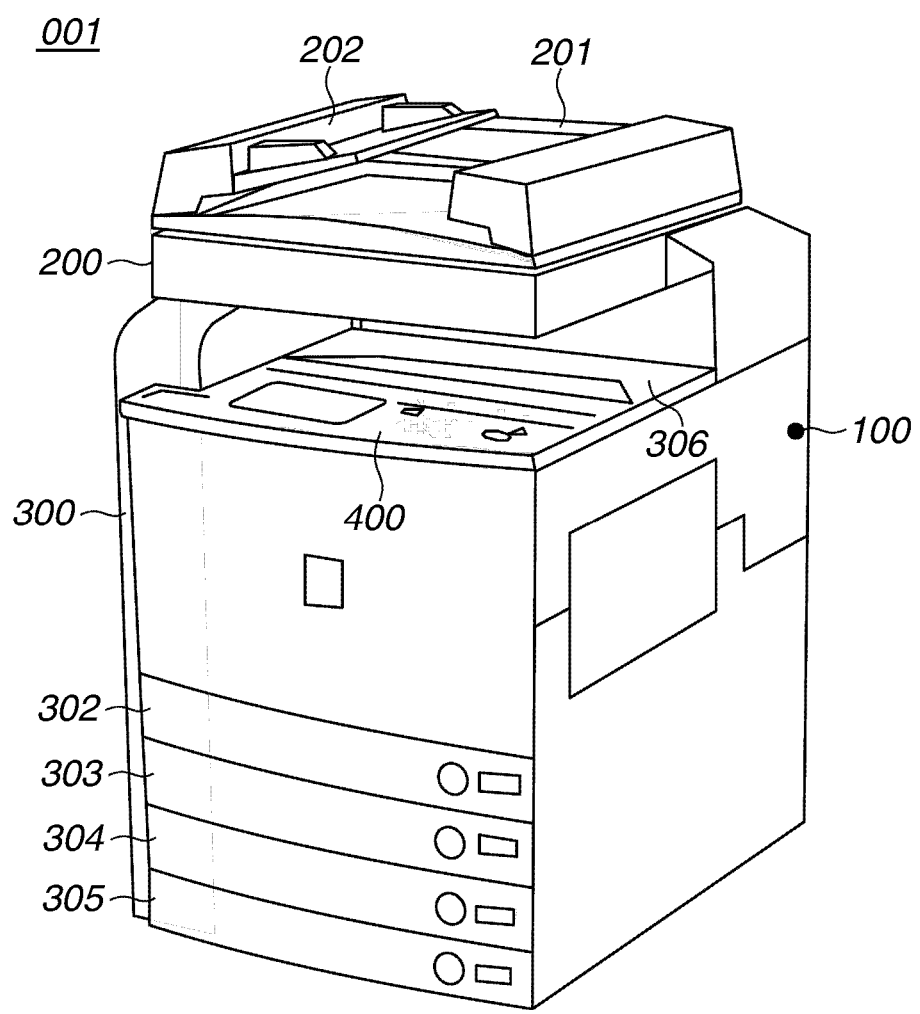
FIG. 1 illustrates an overview of a digital multifunction peripheral according to the exemplary embodiments of the present invention.

FIG. 1 illustrates a configuration of a digital multifunction peripheral 001 having an input device and an image processing system according to exemplary embodiments of the present invention. Referring to FIG. 1, the digital multifunction peripheral 001 includes a controller 100 provided therein, a scanner 200, a printer 300, and an operation unit 400. Each unit will be described in detail below.

Figure 2:
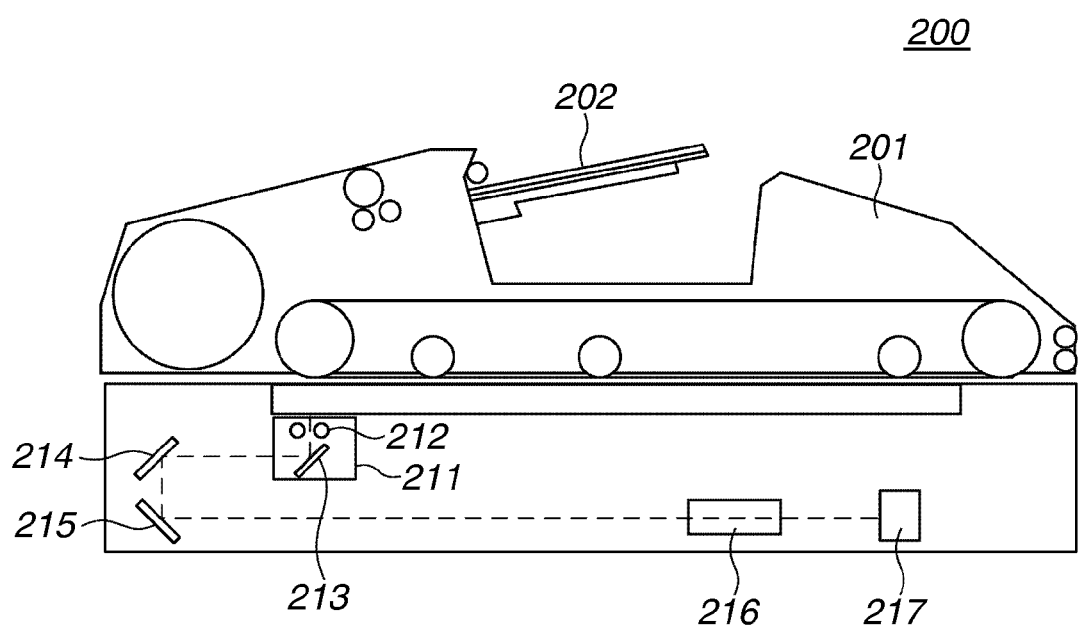
FIG. 2 illustrates a configuration of a scanner of the digital multifunction peripheral according to the exemplary embodiments of the present invention.

FIG. 2 illustrates a detailed configuration of the scanner 200 (image input device) illustrated in FIG. 1.

Referring to FIG. 2, the scanner 200 includes a document feeder 201, a tray 202, a scanner unit 211, a document illumination lamp 212, scanning mirrors 213 to 215, a lens 216, and a charge-coupled device (CCD) sensor 217.

The scanner unit 211 inputs a reflected light from a document to the CCD sensor 217 via the scanning mirrors 213 to 215 and the lens 216. The CCD sensor 217 includes RGB line sensors. Then, the scanner unit 211 converts the reflected light into an electric signal representing image data.

Figure 3:
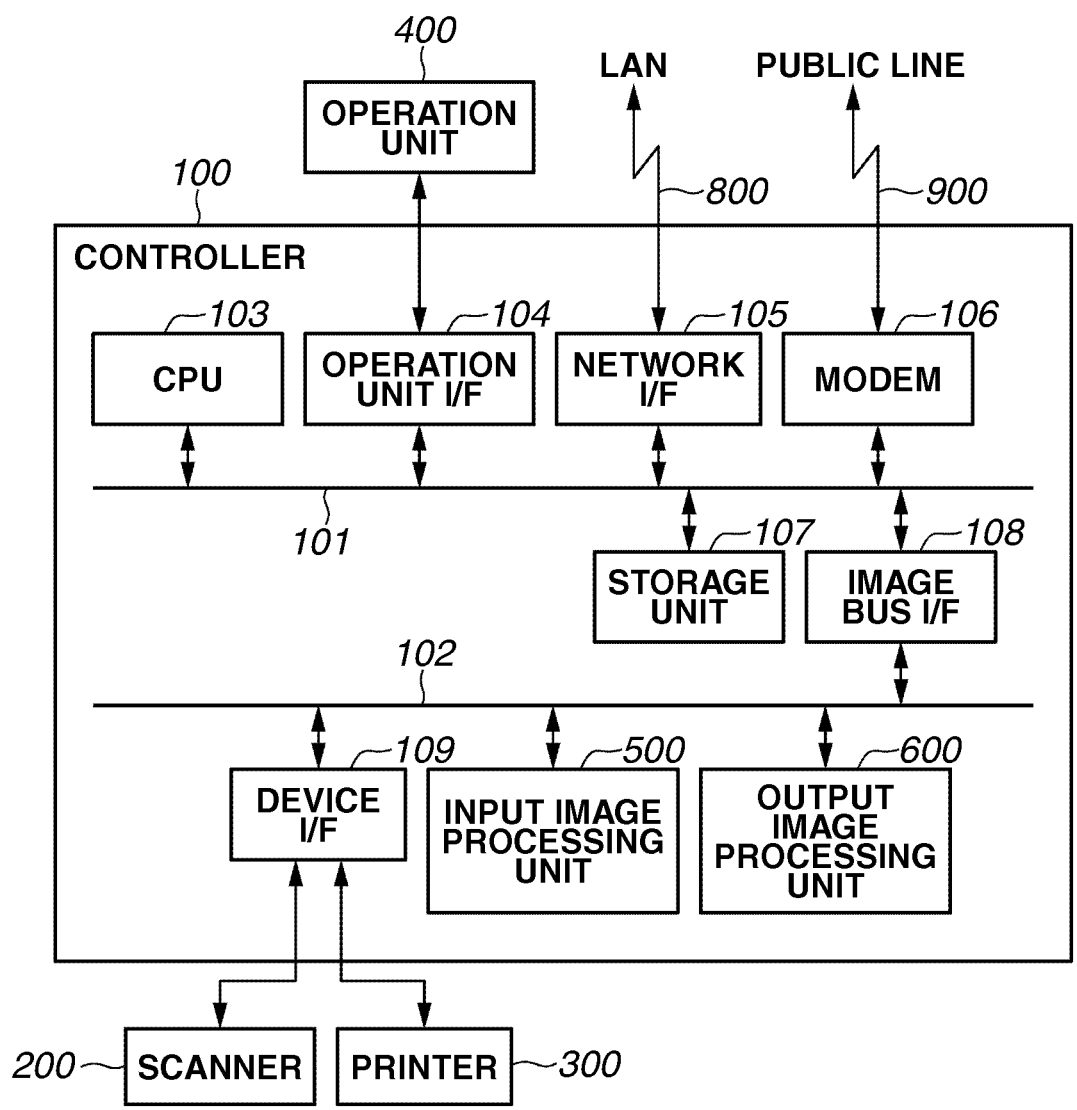
FIG. 3 illustrates a configuration of a controller of the digital multifunction peripheral according to the exemplary embodiments of the present invention.

When a user sets document sheets onto the tray 202 of the document feeder 201 and gives a scanning start instruction from the operation unit 400, a central processing unit (CPU) 103 illustrated in FIG. 3 gives a relevant instruction to the scanner 200. Then, the document feeder 201 feeds document sheets one by one and scans a document image from the document sheet.

There are two different types of document feeder 201: a reversible two-sided type (for scanning one side of a document sheet, reversing the document sheet, and scanning the other side) and a one-pass two-sided type (for scanning both sides of a document sheet with one operation). The type of the document feeder 201 is not particularly limited by the present invention.

Referring to FIG. 1, the printer 300 (image output device) converts raster image data into an image on a sheet of paper.

There are some printing methods such as an electrophotographic method for fixing toner onto a sheet of paper by using a photosensitive drum and a photosensitive belt, and an inkjet method for discharging ink from a minute nozzle array to print an image directly onto a sheet of paper. The printing method is not particularly limited by the present invention.

Print operation is activated by an instruction from the CPU 103 of the controller 100. The printer 300 includes a plurality of feed stages so that different paper sizes or different paper orientations can be selected, and relevant paper cassettes 302, 303, 304, and 305. A discharge tray 306 receives printed sheets.

FIG. 3 illustrates a configuration of a controller of the digital multifunction peripheral 001 according to the present exemplary embodiment.

The controller 100 connects with the scanner 200 (image input device) and the printer 300 (image output device), and also with a local area network (LAN) 800 and a public line 900 to input and output image data and device information.

The CPU 103 serves as a controller for entirely controlling the digital multifunction peripheral 001.

A storage unit 107 is used to store image data and compressed data. The storage unit 107 includes a system work memory to enable an operation of the CPU 103.

An operation unit interface (I/F) 104 interfaces with the operation unit 400 to output to the operation unit 400 image data to be displayed on the operation unit 400. The operation unit I/F 104 also transfers to the CPU 103 information input from the operation unit 400 by the user. A network I/F 105 connects with the LAN 800 to input and output information. A modem 106 connects with the public line 900 and performs modulation/demodulation processing to enable data transmission and reception. The above-mentioned devices are arranged on a system bus 101.

An image bus I/F 108 is a bus bridge which connects the system bus 101 with an image bus 102, which transfers image data at high speed, to convert data structure. The image bus 102 is a high-speed bus such as a protocol control information (PCI) bus or Institute of Electrical and Electronics Engineers (IEEE)1394. A device I/F unit 109 connects the controller 100 with the scanner 200 (image input device) and the printer 300 (image output device) to convert synchronous image data to asynchronous image data and vice versa.

An input image processing unit 500 corrects, processes, and edits input image data such as an image scanned by the scanner 200 as well as an image received from outside via the network I/F unit 105, and then applies processing suitable for subsequent print output or image transmission. An output image processing unit 600 applies correction processing suitable for each printer to print output image data.

Figure 4:
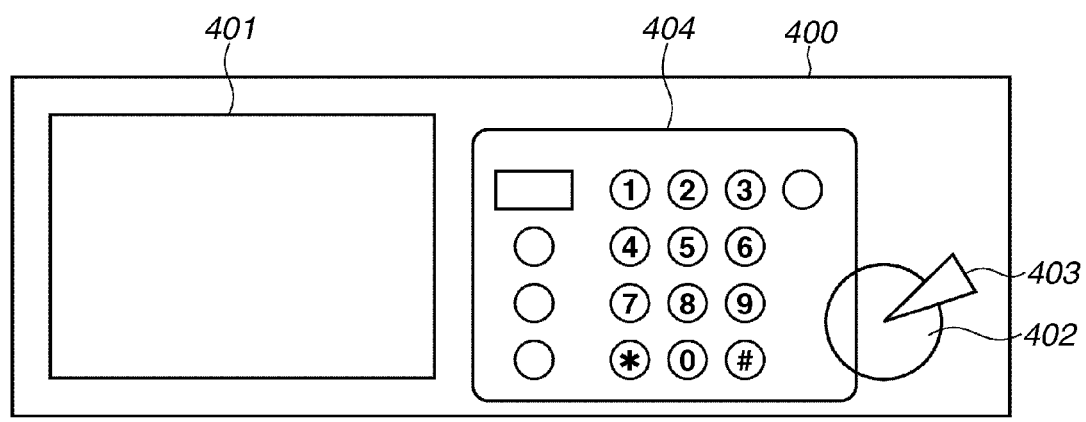
FIG. 4 illustrates an operation unit of the digital multifunction peripheral according to the exemplary embodiments of the present invention.

FIG. 4 illustrates the operation unit 400 of the digital multifunction peripheral 001 according to the present exemplary embodiment.

A liquid crystal operation panel 401, a combination of a liquid crystal display with a touch panel, displays settings and soft keys. A start key 402 is a hard key for instructing the digital multifunction peripheral 001 to start, for example, a copy operation. The start key 402 including a green and red light-emitting diodes (LEDs) lights up in green when the digital multifunction peripheral 001 is ready to start the operation or in red when it is not ready to start the operation.

A stop key 403 is a hard key used to stop the operation of the digital multifunction peripheral 001. A hard key group 404 includes a numeric keypad, a clear key, a reset key, a guide key, and a user mode key.

Figure 5:
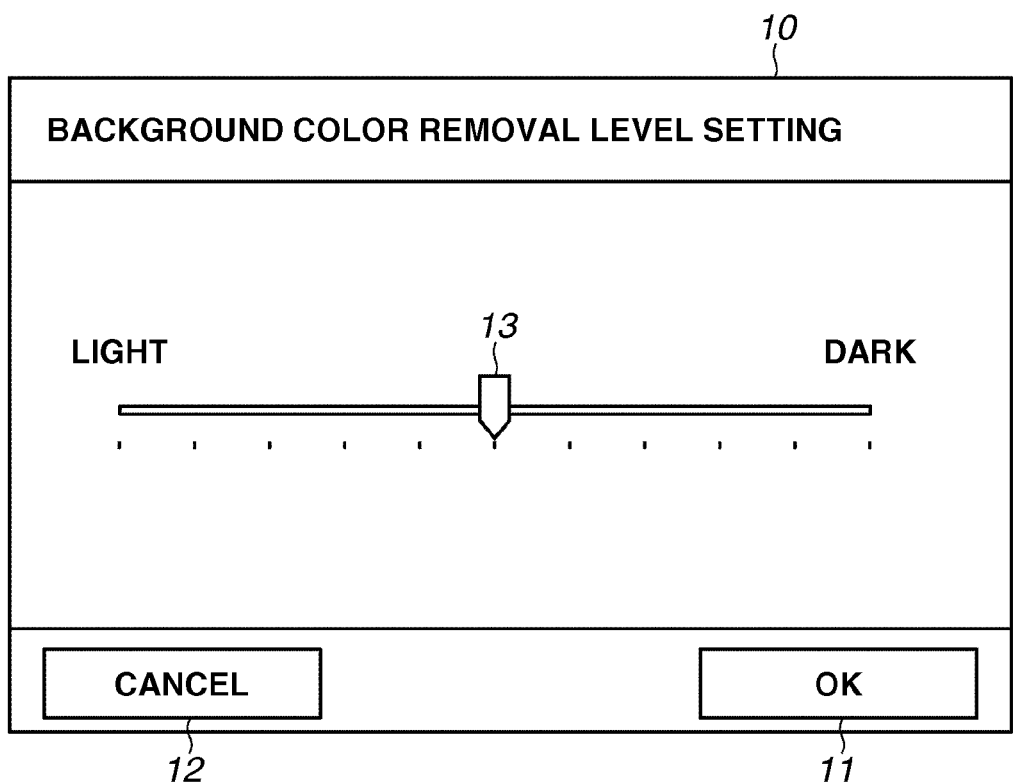
FIG. 5 illustrates an exemplary background removal level setting screen according to a first exemplary embodiment of the present invention.

FIG. 5 illustrates an exemplary background removal level setting screen. A background removal level setting screen 10 illustrated in FIG. 5 is displayed on the liquid crystal operation panel 401 (FIG. 4). Before copying image data, the user sets the background removal level by using a background removal level adjustment bar 13.

The background removal level setting screen 10 includes the background removal level adjustment bar 13, an OK button 11, and a CANCEL button 12.

The user can change the background removal level by operating the background removal level adjustment bar 13. For example, moving the background removal level adjustment bar 13 to the right raises the background removal level (luminance value) so that less amount of the background is to be removed. Conversely, moving the background removal level adjustment bar 13 to the left lowers the background removal level (luminance value) so that more amount of the background is to be removed.

The background removal processing refers to processing for setting the luminance value of a pixel having a luminance value exceeding the background removal level (luminance value) to 255. Thus, a pixel having a luminance value exceeding the background removal level can be whitened.

When the user moves the background removal level adjustment bar 13 and then presses the OK button 11, the settings currently displayed in the setting screen 10 are applied and then the setting screen 10 is closed. When the user presses the CANCEL button 12, the settings immediately before opening the setting screen 10 are restored and then the setting screen 10 is closed.

With the background removal level adjustment bar 13, a user interface (UI) value setting is as follows, for example, when the UI value setting is adjusted in eight steps. UI value=$\{0, 1, 2, 3, 4, 5, 6, 7\}$ The larger the UI value, the darker becomes the background setting. Specifically, the background removal processing is likely to leave the background. The smaller the UI value, the lighter becomes the background setting.

Figure 6:
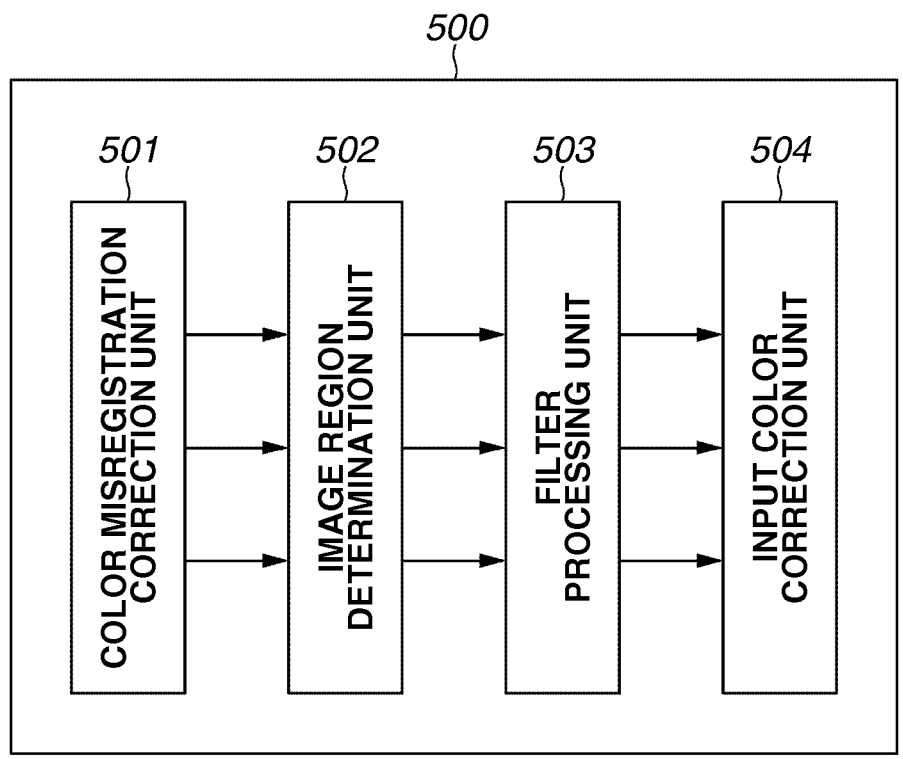
FIG. 6 illustrates an exemplary input image processing unit according to the first exemplary embodiment of the present invention.

FIG. 6 is a block diagram illustrating a configuration of the input image processing unit 500 according to a first exemplary embodiment of the present invention.

A color misregistration correction unit 501 applies color misregistration correction to an RGB input image in both main and sub scanning directions. For example, the color misregistration correction unit 501 performs a matrix calculation of 1×5 in the sub scanning direction and the matrix calculation of 5×1 in the main scanning direction.

An image region determination unit 502 identifies an image type in an input image. For example, the image region determination unit 502 identifies pixels constituting respective image types such as photograph portion/text portion, chromatic color portion/achromatic color portion in the input image, and generates attribute flag data indicating the pixel type on a pixel basis.

A filter processing unit 503 arbitrarily corrects a spatial frequency of an input image, for example, performs a product-sum operation of 9×9.

An input color correction unit 504 corrects a tint of an input image, for example, performs such processing as conversion of the color space of the input image into an arbitrary color space.

Figure 7:
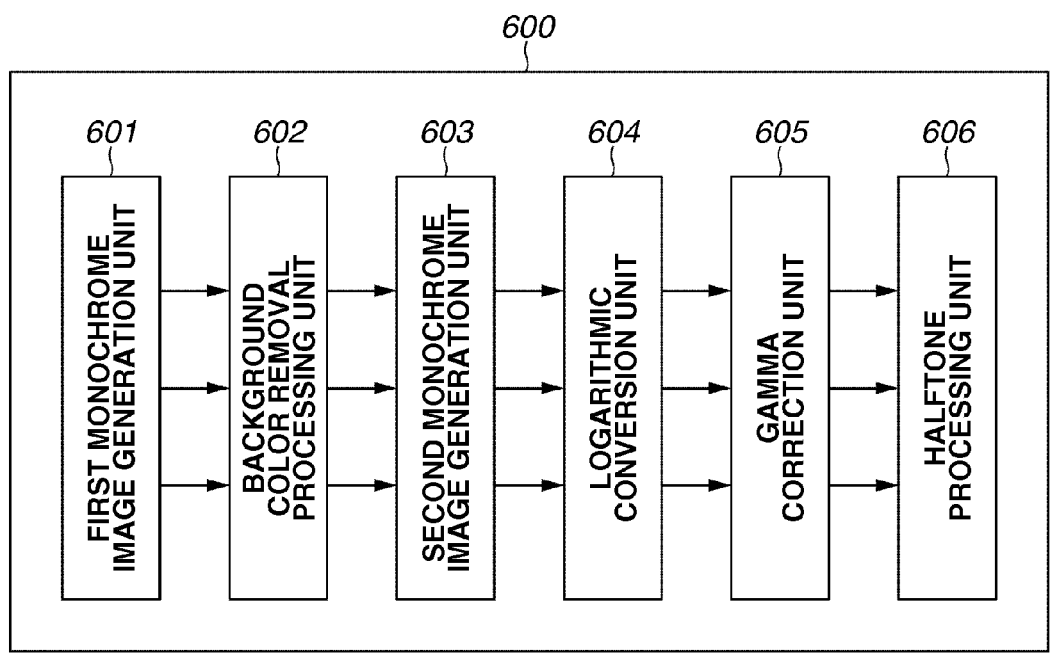
FIG. 7 illustrates an exemplary output image processing unit according to the first exemplary embodiment of the present invention.

FIG. 7 is a block diagram illustrating a configuration of the output image processing unit 600 according to the first exemplary embodiment of the present invention.

A first monochrome image generation unit 601 converts color image data into monochrome image data and, when making monochrome printing, converts the RGB color data into gray monochrome data.

Figure 17:
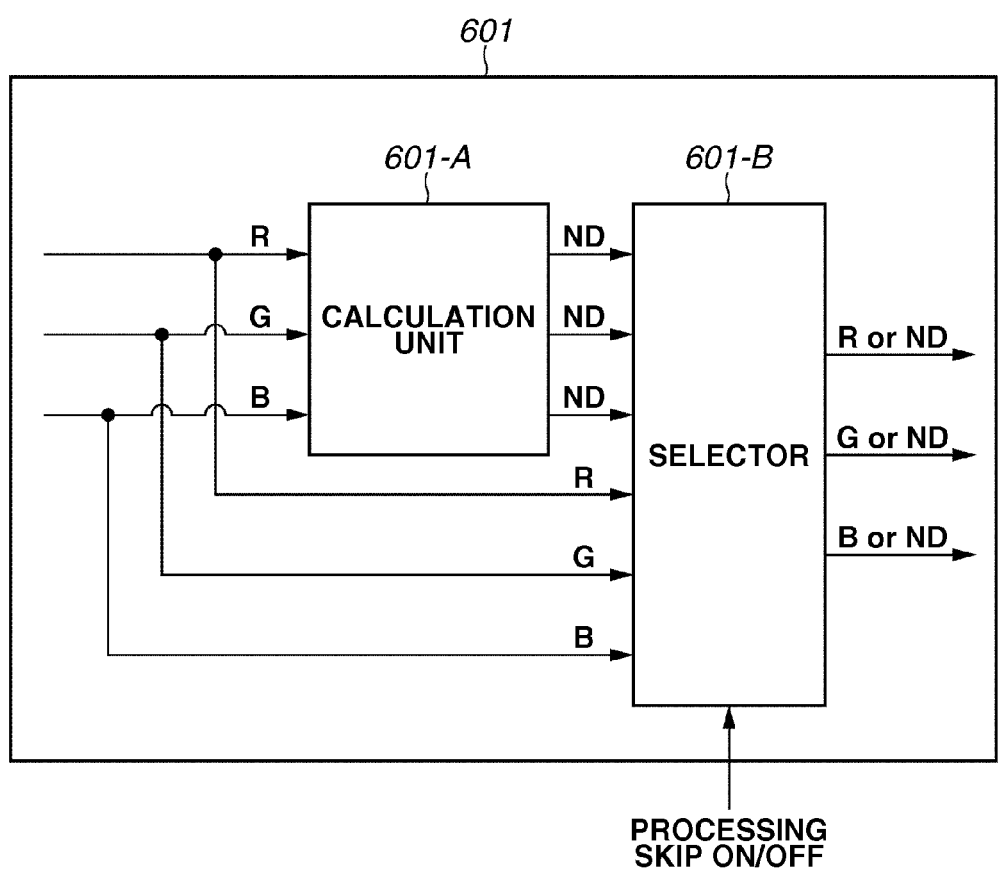
FIG. 17 illustrates a configuration of a monochrome image generation unit according to the exemplary embodiments of the present invention.

As illustrated in FIG. 17, the first monochrome image generation unit 601 includes a calculation unit 601-A for performing the matrix calculation. The first monochrome image generation unit 601 further includes a selector 601-B for inputting a monochrome signal (ND) output from the calculation unit 601-A and an RGB signal before the matrix calculation by the calculation unit 601-A, and selecting and outputting either the ND signal or the RGB signal depending on a processing-skip ON/OFF setting from the CPU 103.

A background removal processing unit 602 performs processing for removing the background of the background portion of image data.

A second monochrome image generation unit 603 has a similar function to the first monochrome image generation unit 601, and therefore duplicated explanation will be omitted.

A logarithmic conversion unit 604 converts luminance data into density data by regularly using a one-dimensional LUT.

A gamma correction unit 605 performs gamma correction according to the characteristics of the printer 300 by regularly using the one-dimensional LUT.

A halftone processing unit 606 performs arbitrary pseudo-halftone processing according to the number of gradations of the printer 300. Specifically, the halftone processing unit 606 performs binary processing, multivalued (32 values) processing, and any other screen processing and error diffusion processing.

When performing a color output to the RGB image data obtained by the scanner 200, the processing of the first monochrome image generation unit 601 and the second monochrome image generation unit 603 is skipped, and the background removal processing unit 602 applies the background removal processing to the RGB image data.

The CPU 103 controls execution and a coefficient setting of the input image processing unit 500 and the output image processing unit 600.

Figure 8:
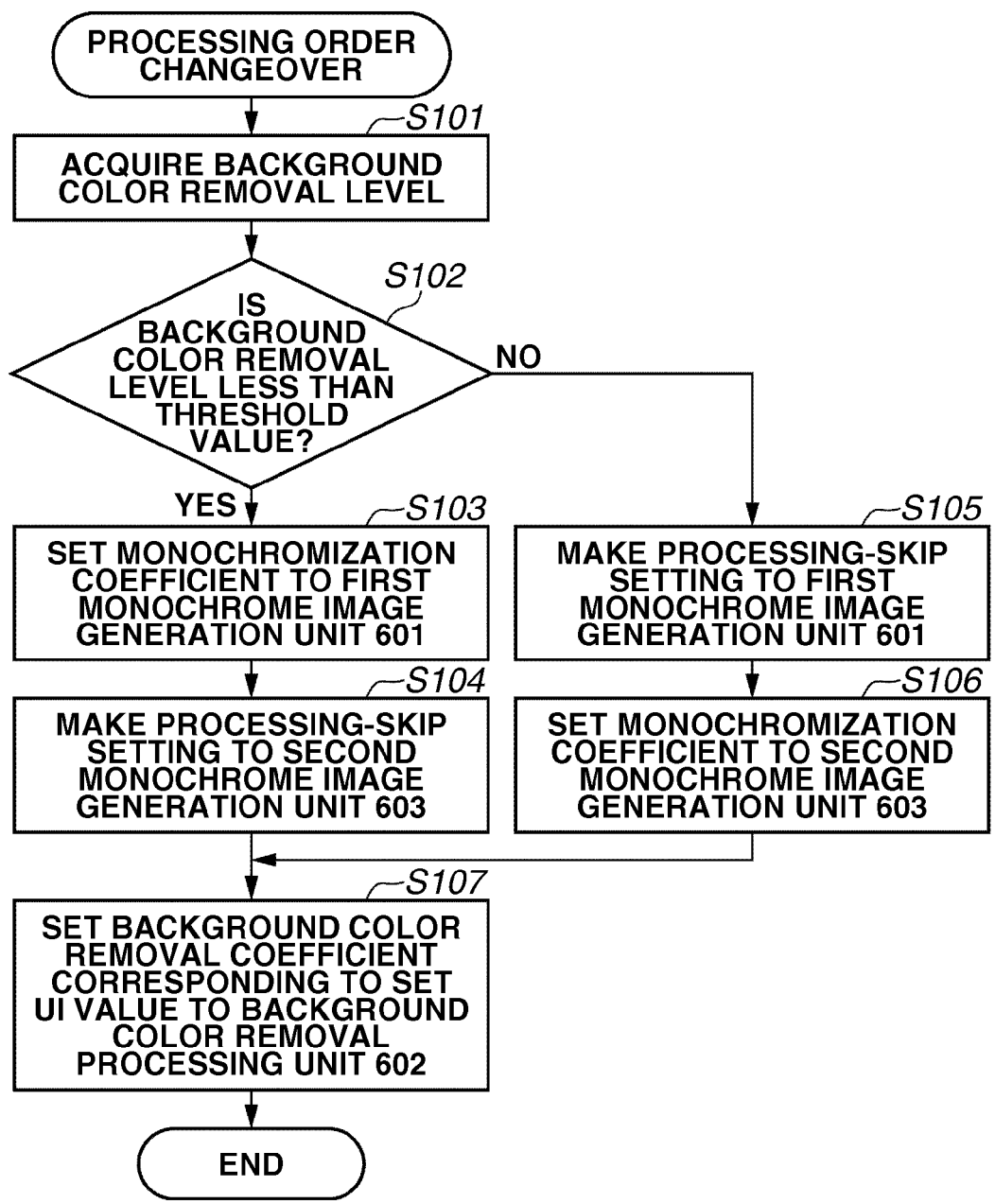
FIG. 8 is a flowchart illustrating processing according to the first exemplary embodiment of the present invention.

The processing for setting the execution order of the monochromization processing and the background removal processing according to the present exemplary embodiment will be described below with reference to FIG. 8. FIG. 8 illustrates a flowchart for setting the execution order of the monochromization processing and the background removal processing in the present exemplary embodiment.

The flowchart illustrated in FIG. 8 is achieved when the CPU 103 loads a program for executing each step of the flowchart (FIG. 8) from the storage unit 107 into the RAM (not illustrated) in the controller 100 and then executes it.

In step S101, the CPU 103 acquires the background removal level set in the background removal level setting screen (FIG. 5).

In step S102, the CPU 103 compares the background removal level (luminance value) corresponding to the setting value (acquired in step S101) with a preset luminance threshold value for determination. When the background removal level (luminance value) corresponding to the setting value acquired in step S101 is less than the luminance threshold value (YES in step S102), the processing proceeds to step S103. When the background removal level (luminance value) corresponding to the setting value acquired in step S101 is equal to or greater than the threshold value (NO in step S102), the processing proceeds to step S105.

The luminance threshold value for determination is desirably set, when an image on a sheet of white paper is to be copied for example, to a value with which the color of the background portion of the paper can be converted to white through the background removal processing.

A relation between the setting value acquired in step S101 and the background removal level (luminance value) corresponding thereto is shown below.
Setting value={0, 1, 2, 3, 4, 5, 6, 7}
Background removal level={110, 130, 150, 170, 190, 210, 230, 255}

In step S102, when the setting value acquired in step S101 is 5, for example, the background removal level corresponding to the setting value is 210. When the luminance threshold value for determination is 230, since the background removal level is less than the luminance threshold value for determination, the processing proceeds to step S103. When the setting value acquired in step S101 is 7, for example, the background removal level corresponding to the setting value is 255. When the luminance threshold value for determination is 230, since the background removal level is greater than the luminance threshold value for determination, the processing proceeds to step S105.

In step S103, the CPU 103 sets a monochromization coefficient to the first monochrome image generation unit 601. As the monochromization coefficient, the CPU 103 sets coefficients like Rr:3, Gr:6, Br:1 as calculation coefficients.

The monochromization coefficient is given by a formula (1).

$$(Rin \times Rr + Gin \times Gr + Bin \times Br)/(Rr + Gr + Br) \quad (1)$$

For example, when the pixel data of the input image includes Rin:250, Gin:240, Bin:140, the formula (1) gives (250×3+240×6+140×1)/(3+6+1)=233. Therefore, the pixel value of the monochrome image data is 233.

In step S104, the CPU 103 makes a processing-skip setting to the second monochrome image generation unit 603.

In step S105, the CPU 103 makes the processing-skip setting to the first monochrome image generation unit 601. The processing-skip setting in step S105 is input to the selector 601-B (FIG. 17).

In step S106, the CPU 103 sets the monochromization coefficient to the second monochrome image generation unit 603. As the monochromization coefficient, the CPU 103 sets coefficients like Rr:3, Gr:6, Br:1 as calculation coefficients.

In step S107, the CPU 103 sets the background removal level corresponding to the setting value (acquired in step S101) to the background removal processing unit 602. The relation between the setting value and the background removal level (luminance value) corresponding thereto is as described above.

The background removal processing unit 602 performs nonlinear background removal processing, for example, by using formulas (2) and (3).

$$R2 = R1 + Rmat(R1 \times G1 \times B1/(255 \times 255 \times 255))$$

$$G2 = G1 + Gmat(R1 \times G1 \times B1/(255 \times 255 \times 255))$$

$$B2 = B1 + Bmat(R1 \times G1 \times B1/(255 \times 255 \times 255)) \quad (2)$$

where Rmat, Gmat, and Bmat are background removal coefficients to be set to the background removal processing unit 602; R1, G1, and B1 are input pixel values; and R2, G2, and B2 are output pixel values.

$$Rmat = (255 - Rs) \times Xinv$$

$$Gmat = (255 - Gs) \times Xinv$$

$$Bmat = (255 - Bs) \times Xinv \quad (3)$$

$$Xinv = 1/Xmat$$

$$Xmat = Rs \times Gs \times Bs/(255 \times 255 \times 255)$$

where Rs, Gs and Bs are background removal levels corresponding to the setting values of the background removal level setting screen 10 (FIG. 5).

The CPU 103 executes the flowchart illustrated in FIG. 8 to set the execution order switching between the monochromization processing and the background removal processing, and then starts the following copy operation.

First of all, the scanner 200 scans a document image to obtain color image data (RGB image data). Then, the input image processing unit 500 applies image processing to the color image data. After the input image processing unit 500 processes the image data, the output image processing unit 600 processes the image data and then the printer 300 prints the image data.

When the background removal level corresponding to the value set in the background removal level setting screen 10 (FIG. 5) is less than the luminance threshold value for determination (when the background removal level is a level for removing the background), the first monochrome image generation unit 601 of the output image processing unit 600 applies the monochromization processing to the image data to generate monochrome image data.

Then, the background removal processing unit 602 applies the background removal processing to the generated monochrome image data by using the background removal level set in the background removal level setting screen 10 (FIG. 5). Then, the logarithmic conversion unit 604, the gamma correction unit 605, and the halftone processing unit 606 apply respective processing to the monochrome image data having undergone the background removal processing.

When the background removal level corresponding to the value set in the background removal level setting screen 10 (FIG. 5) is less than the luminance threshold value for determination, the second monochrome image generation unit 603 is skipped.

When the set background removal level is less than a luminance threshold value, the monochromization processing is applied to the image data before the background removal processing is applied thereto. This enables the removal of the color of the background portion of the image data even in the case of a large difference in RGB values of the background portion of the image data.

When the background removal level corresponding to the value set in the background removal level setting screen 10 (FIG. 5) is equal to or greater than the luminance threshold value for determination (when the background removal level is a level for not removing the background), the background removal processing unit 602 applies the background removal processing to the image data based on the background removal level to generates image data having undergone the background removal processing.

Then, the second monochrome image generation unit 603 applies the monochromization processing to the image data having underdone the background removal processing to generate monochrome image data. Then, the logarithmic conversion unit 604, the gamma correction unit 605, and the halftone processing unit 606 apply respective processing to the monochrome image data. When the background removal level corresponding to the value set in the background removal level setting screen 10 (FIG. 5) is equal to or greater than the luminance threshold value for determination, the first monochrome image generation unit 601 is skipped.

When the set background removal level is equal to or greater than the luminance threshold value, the background removal processing is applied to the input image data before the monochromization processing is applied thereto. This execution order can leave high-luminance (fluorescent colored and yellow) regions and texts included in the input image data.

For example, as illustrated in FIGS. 16A and 16B, image information (high-luminance region) included in the input image data has luminance values of R:250, G:240, B:140, and the background portion has luminance values of R:250, G:251, B:248.

For example, as illustrated in FIG. 16B, when the monochromization processing is applied before the background removal processing, both the image information and the background have luminance values of R:255, G:255, B:255 after the background removal processing. This means that the image information has disappeared.

As illustrated in FIG. 16A, when the background removal processing is applied before the monochromization processing, the image information has luminance values of R:245, G:245, B:245, and the background portion has luminance values of R:255, G:255, B:255 after the monochromization processing. This means that the image information can be left.

FIG. 19 illustrates an output signal having RGB values (R, G, B) when the background removal level is varied with respect to an input signal having RGB values of R:250, G:240, B:140. Referring to FIG. 19, a solid line 191 indicates output signal RGB values when the monochromization processing is applied before the background removal processing, and a dotted line 192 indicates output signal RGB values when the background removal processing is applied before the monochromization processing.

For example, with a background removal level of 255, the output signal has RGB values of R:233, G:233, B:233 when the background removal processing is applied before the monochromization processing, and vice versa. With a background removal level of 233, when the monochromization processing is applied before the background removal processing, the output signal has RGB values of R:255, G:255, B:255. With a background removal level of 233, when the background removal processing is applied before the monochromization processing, the output signal has RGB values of R:240, G:240, B:240.

Applying the background removal processing before the monochromization processing enables a change rate of output signal RGB values with respect to the background removal level to be more moderate and accordingly leaving more amount of color information corresponding to input signal RGB values than applying the monochromization processing before the background removal processing.

In the present exemplary embodiment, when the set background removal level is equal to or greater than the luminance threshold value (when the background removal level is a level for not removing the background that much), the background removal processing is applied before the monochromization processing. When the set background removal level is less than the luminance threshold value (when the background removal level is a level for removing more amount of the background), the monochromization processing is applied before the background removal processing.

Thus, when the set background removal level is equal to or greater than the luminance threshold value, the dotted line 192 is applied in FIG. 19. When the set background removal level is less than the luminance threshold value, the solid line 193 is applied in FIG. 19.

The processing for changing the execution order of the background removal processing and the monochromization processing according to the background removal level in the present exemplary embodiment can leave more amount of information after the two pieces of processing than the processing for applying the monochromization processing and the background removal processing in this fixed order and changing the background removal level (the solid line 191 in FIG. 19). A shaded portion in FIG. 19 indicates a difference in effect (information that can be left) between the present exemplary embodiment and a case where the monochromization processing is applied before the background removal processing.

Although the present exemplary embodiment has specifically been described based on the copy operation, it is also possible to transmit an image having undergone the background removal processing and the monochromization processing to an external apparatus via the LAN 800 or the public line 900.

Although, in the present exemplary embodiment, two monochrome image generation units 601 and 603 and the background removal processing unit 602 are provided, and each unit is turned ON or OFF, two background removal processing units and a monochrome image generation unit may be provided. In this case, either one of the two background removal processing units is turned ON to change the execution order of the background removal processing unit and the monochrome image generation unit.

Although, in the present exemplary embodiment, the monochrome image generation units 601 and 603 and the background removal processing unit 602 are provided in the output image processing unit 600, the arrangements of these units are not limited thereto. Any one of the monochrome image generation units 601 and 603 and the background removal processing unit 602 may be provided in the input image processing unit 500.

Figure 18:
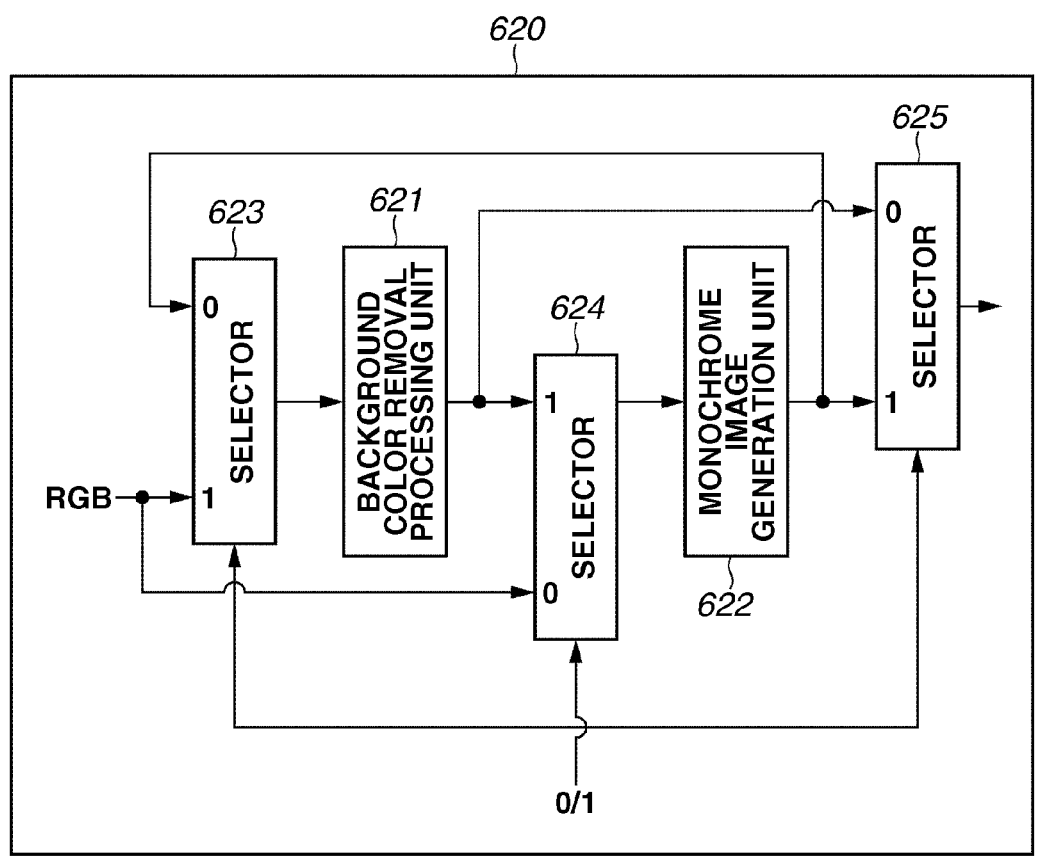
FIG. 18 illustrates exemplary execution order switching according to the exemplary embodiments of the present invention.

Although, in the present exemplary embodiment, two monochrome image generation units 601 and 603 are provided, a monochrome image generation unit 622 may be provided, as illustrated in FIG. 18, and the order of a background removal processing unit 621 and the monochrome image generation unit 622 may be changed by using the selectors 623, 624, and 625.

FIG. 18 illustrates an output image processing unit 620 which is different from the output image processing unit 600 (FIG. 7) in configuration of the background removal processing unit and the monochrome image generation unit. The output image processing unit 620 includes a background removal processing unit 621, a monochrome image generation unit 622, and selectors 623, 624, and 625.

When the CPU 103 inputs a 0/1 signal to the selectors 623, 624, and 625, a plurality of signals input to these selectors are selected to enable the change of the execution order of the background removal processing unit 621 and the monochrome image generation unit 622.

In the first exemplary embodiment, the execution order of the monochromization processing and the background removal processing is determined according to the background removal level set in the background removal level setting screen 10 (FIG. 5). In a second exemplary embodiment, the background removal level of the background portion in the input image data is detected to determine the execution order of the monochromization processing and the background removal processing according to the detected background removal level.

Figure 10:
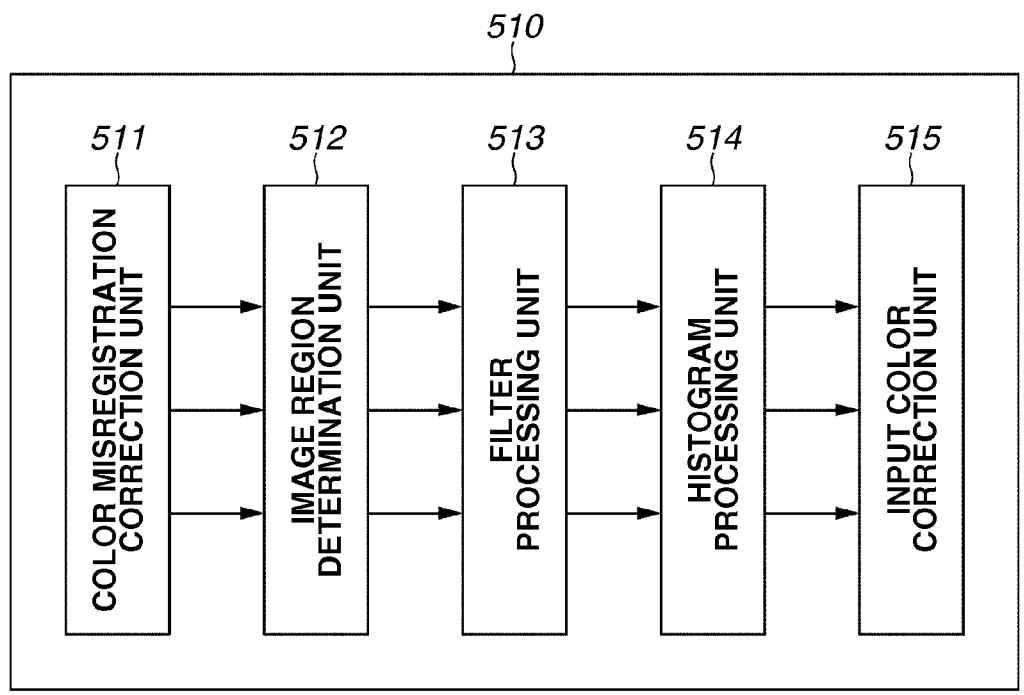
FIG. 10 illustrates an exemplary input image processing unit according to the second exemplary embodiment of the present invention.

FIG. 10 is a block diagram of an input image processing unit 510 according to the present exemplary embodiment, which substitutes for the input image processing unit 500 (FIG. 6).

Processing of a color misregistration correction unit 511, an image region determination unit 512, a filter processing unit 513, and an input color correction unit 515 included in the input image processing unit 510 (FIG. 10) is similar to the processing of the color misregistration correction unit 501, the image region determination unit 502, the filter processing unit 503, and the input color correction unit 504, respectively, included in the input image processing unit 500 described in the first exemplary embodiment, and therefore duplicated explanation will be omitted. The processing of the output image processing unit 620 in the second exemplary embodiment is similar to the processing of the output image processing unit 600 in the first exemplary embodiment, and therefore duplicated explanation will be omitted.

A histogram processing unit 514 samples and counts an image signal from input image data, and determines the background removal level in a document based on histograms acquired from RGB values of the input image data.

For example, based on sampled histograms, Rs, Gs, and Bs values, each having the maximum frequency, are determined as a background removal level as illustrated in FIG. 11.

Further, to ensure more reliable background removal with the background removal level determined by the above-mentioned histograms, an offset value may be subtracted from the Rs, Gs, and Bs values.

Although Rs, Bs, and Gs are obtained from histograms of R, G, and B, respectively, minimum values of Rs, Bs, and Gs (min (Rs, Bs, Gs)) may be used to avoid difference in background removal condition between colors.

Figure 9:
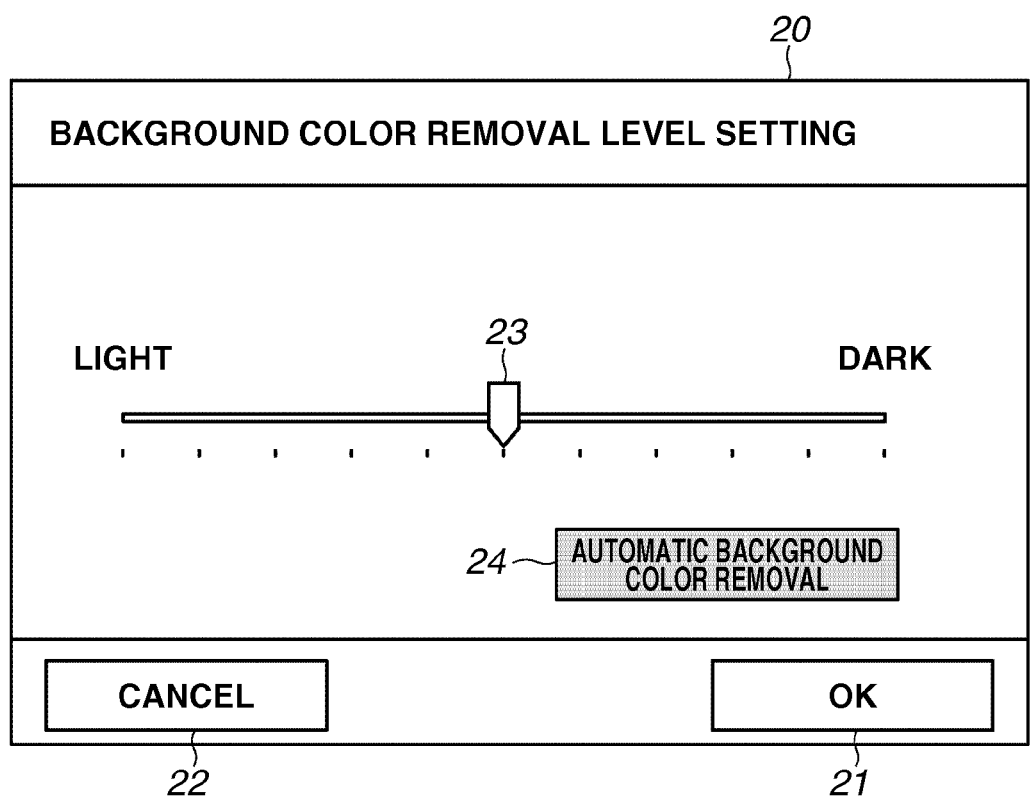
FIG. 9 illustrates an exemplary background removal level setting screen according to a second exemplary embodiment of the present invention.

FIG. 9 illustrates an automatic background removal ON/OFF setting screen 20. The automatic background removal ON/OFF setting screen 20 illustrated in FIG. 9 is displayed on the liquid crystal operation panel 401 (FIG. 4). Before copying image data, the user presses an automatic background removal button 24. Elements other than the automatic background removal button 24 are similar to those in the background removal level setting screen 10 (FIG. 5), and therefore duplicated explanation will be omitted.

The user presses the automatic background removal button 24 to set automatic background removal to ON or OFF.

When the user presses an OK button 21, the settings currently displayed in the setting screen 20 are applied and then the setting screen 20 is closed. When the user presses a CANCEL button 22, the settings immediately before opening the setting screen 20 are restored and then the setting screen 20 is closed.

When the settings are saved with the automatic background removal button 24 set to ON, the value set by the level adjustment bar 23 is disabled, and the automatic background removal processing (described below) is applied.

Figure 12:
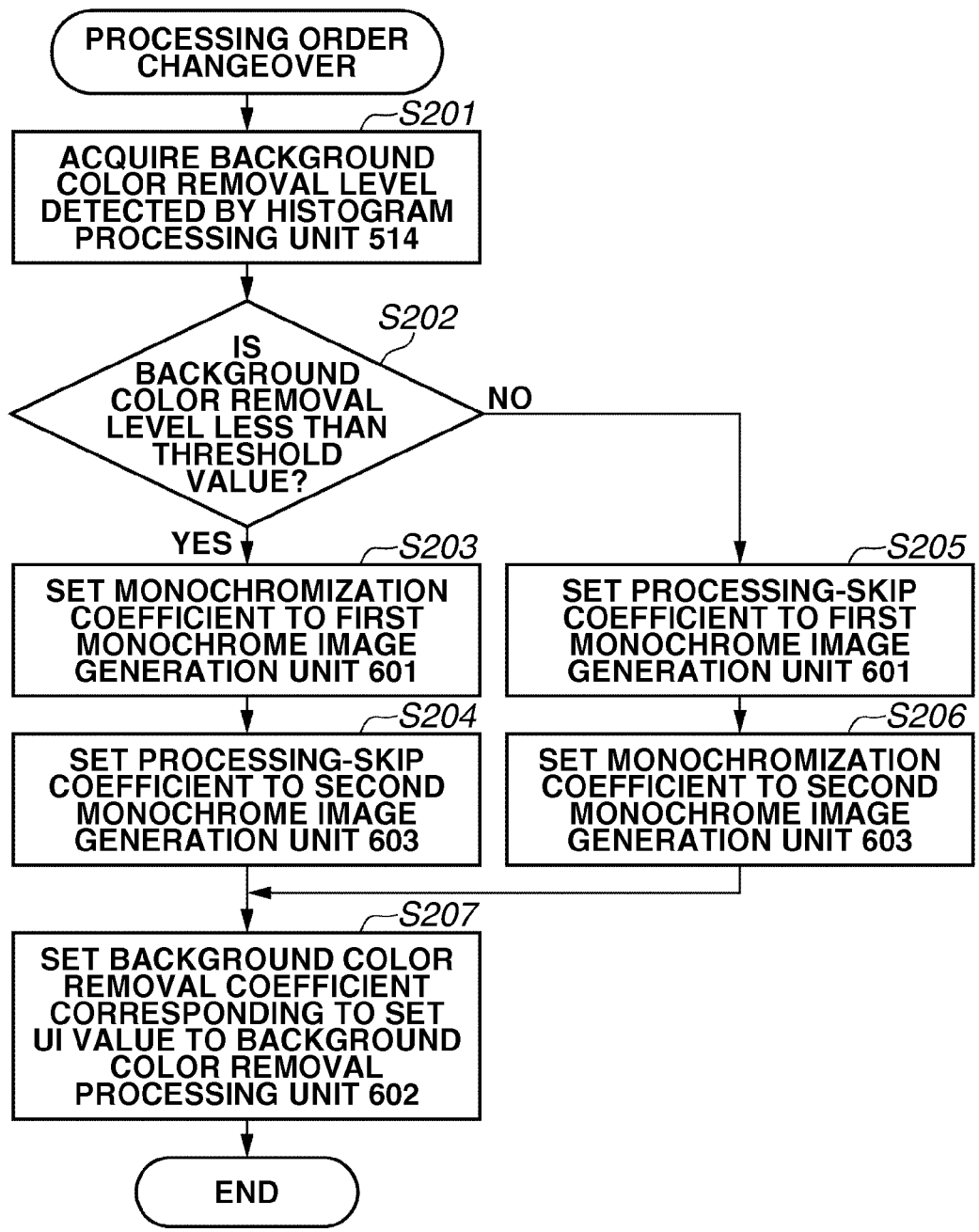
FIG. 12 is a flowchart illustrating processing according to the second exemplary embodiment of the present invention.

The processing for setting the execution order of the monochromization processing and the background removal processing in the second exemplary embodiment will be described below with reference to FIG. 12. FIG. 12 is a flowchart illustrating the processing for detecting the background of input image data and setting the execution order of the monochromization processing and the background removal processing according to a detected background removal level.

Before starting the processing of the flowchart illustrated in FIG. 12, the color misregistration correction unit 511, the image region determination unit 512, and the filter processing unit 513 apply respective processing to the input image data. The histogram processing unit 514 detects a background removal level for the image data processed by the filter processing unit 513.

The flowchart illustrated in FIG. 12 is achieved when the CPU 103 loads a program for executing each step of the flowchart (FIG. 12) from the storage unit 107 into the RAM (not illustrated) in the controller 100 and then executes it.

In step S201, the CPU 103 acquires the background removal levels Rs, Gs, and Bs detected by the histogram processing unit 514.

In step S202, the CPU 103 compares the background removal level acquired in step S201 with a preset threshold value for determination. When the background removal level acquired in step S201 is less than the threshold value (YES in step S202), the processing proceeds to step S203. When the background removal level acquired in step S201 is equal to or greater than the threshold value (NO in step S202), the processing proceeds to step S205.

For example, when the background removal level calculated by the histogram processing unit 514 is 200 and the threshold value for determination is 220, i.e., the background removal level is less than the threshold value for determination, the processing proceeds to step S203. When the background removal level calculated by the histogram processing unit 514 is 240 and the threshold value for determination is 220, i.e., the background removal level is equal to or greater than the threshold value for determination, the processing proceeds to step S205. The processing of steps S203 to S207 is similar to the processing of steps S103 to S107 (FIG. 8) in the first exemplary embodiment, and therefore duplicated explanation will be omitted.

The CPU 103 executes the flowchart illustrated in FIG. 12 to set the execution order switching between the monochromization processing and the background removal processing. Then, the image data having undergone the processing by the input image processing unit 510 is processed by the output image processing unit 600 and then printed by the printer 300.

During execution of the flowchart illustrated in FIG. 12, the image data that has been processed by the input image processing unit 510 may be stored in the storage unit 107. Then, after completion of the processing of the flowchart illustrated in FIG. 12, the image data stored in the storage unit 107 may be read and processed by the output image processing unit 600.

When the background removal level calculated by the histogram processing unit 514 is less than the luminance threshold value for determination, the output image processing unit 600 performs relevant processing. Specifically, the first monochrome image generation unit 601 applies the monochromization processing to the image data. Then, the background removal processing unit 602, the logarithmic conversion unit 604, the gamma correction unit 605, and the halftone processing unit 606 apply respective processing to the image data.

When the background removal level calculated by the histogram processing unit 514 is less than the luminance threshold value for determination, the second monochrome image generation unit 603 is skipped. Even when the background removal level of the background portion in the input image data is less than the luminance threshold value, this processing applies the monochromization processing before the background removal processing, thus removing the color of the background portion in the input image data.

When the background removal level calculated by the histogram processing unit 514 is equal to or greater than the luminance threshold value for determination, the output image processing unit 600 performs relevant processing. Specifically, the background removal processing unit 602 applies the background removal processing to the image data. Then, the second monochrome image generation unit 603, the logarithmic conversion unit 604, the gamma correction unit 605, and the halftone processing unit 606 apply respective processing to the image data.

When the background removal level calculated by the histogram processing unit 514 is equal to or greater than the luminance threshold value for determination, the first monochrome image generation unit 601 is skipped. When the background removal level of the background portion in the input image data is equal to or greater than the luminance threshold value, the background removal processing is applied to the input image data before the monochromization processing is applied thereto. This execution order can leave high-luminance (fluorescent colored and yellow) regions and texts included in the input image data.

A third exemplary embodiment will be described below centering on a method for achieving the execution order switching between the monochromization processing and the background removal processing based on a simpler configuration than the first and second exemplary embodiments.

Figure 13:
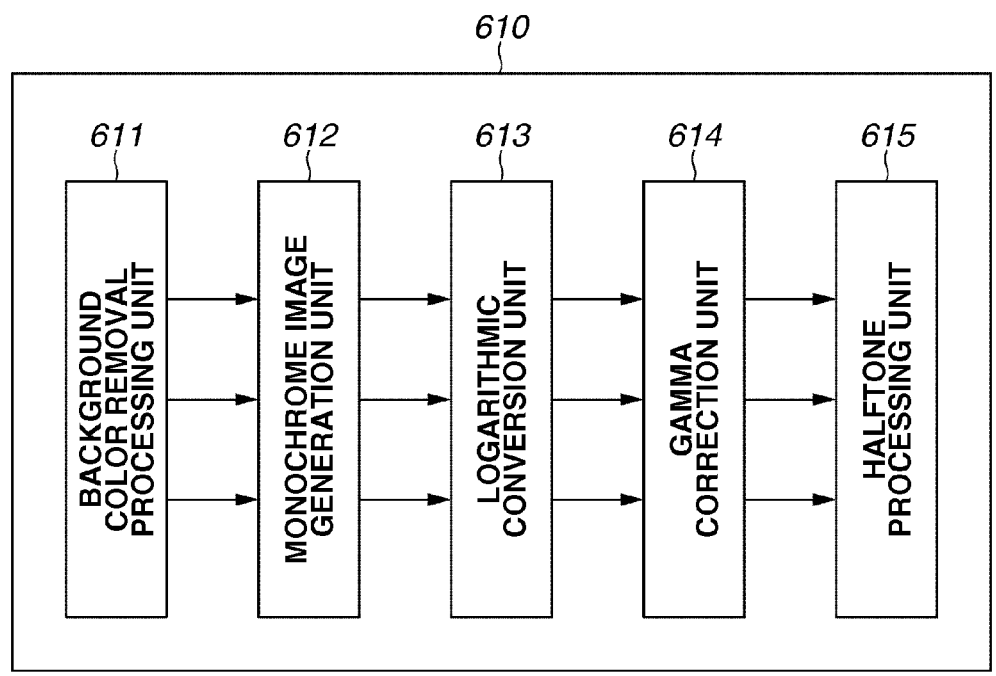
FIG. 13 illustrates an exemplary output image processing unit according to a third exemplary embodiment of the present invention.

FIG. 13 is a block diagram illustrating an output image processing unit 610 according to the present exemplary embodiment, which substitutes for the output image processing unit 600 according to the first exemplary embodiment. The input image processing unit may be the input image processing unit 500 according to the first exemplary embodiment or the input image processing unit 510 according to the second exemplary embodiment.

The processing of the background removal processing unit 611 to the halftone processing unit 615 (FIG. 13) is similar to the processing of the background removal processing unit 602 to the halftone processing unit 606, respectively, illustrated in the block diagram (FIG. 7), and therefore duplicated explanation will be omitted. The processing of the monochrome image generation unit 612 (FIG. 13) is similar to the processing of the first monochrome image generation unit 601 and the second monochrome image generation unit 603 (FIG. 7).

Figure 15:
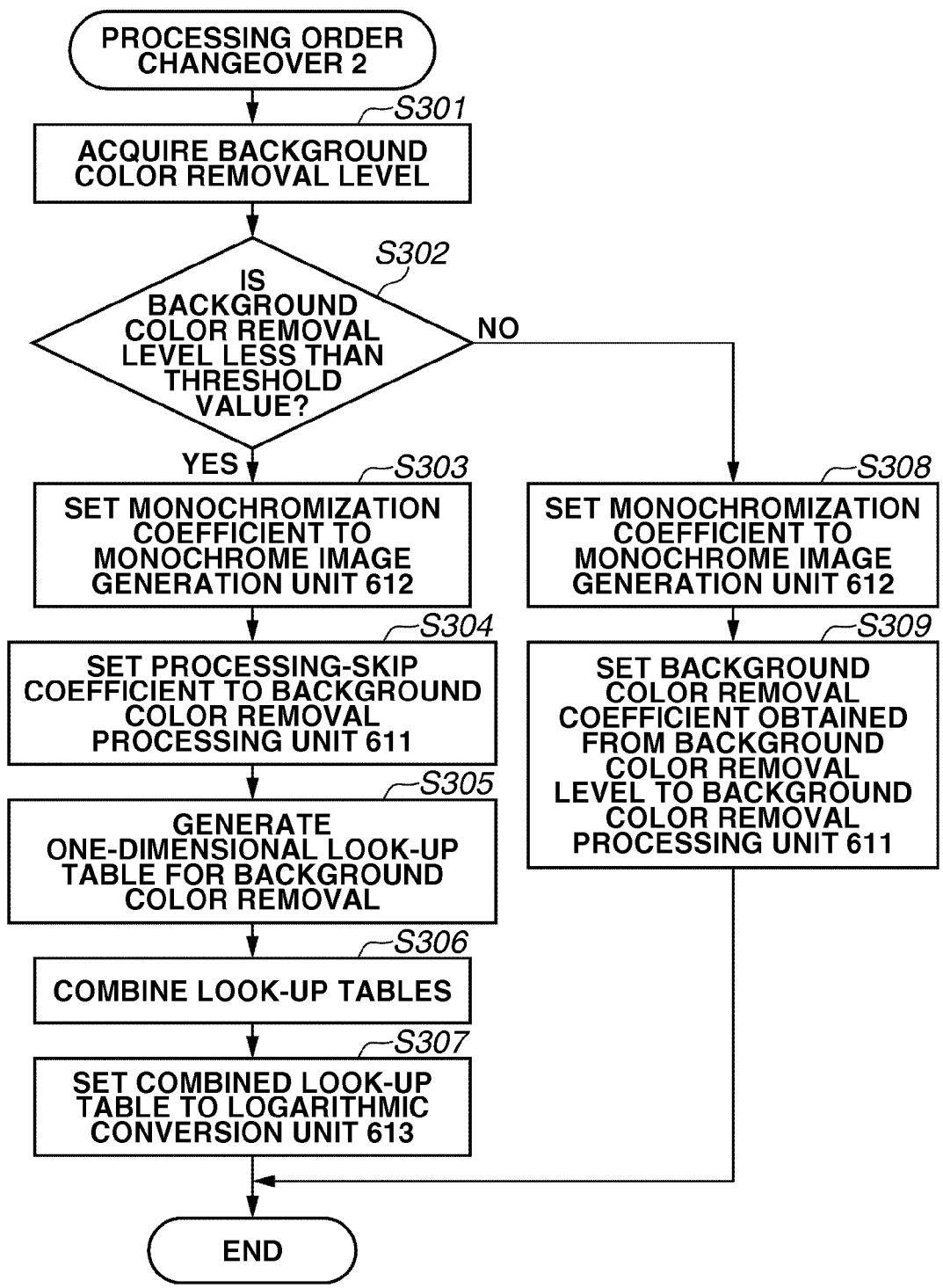
FIG. 15 is a flowchart illustrating processing according to the third exemplary embodiment of the present invention.

The processing for setting the execution order of the monochromization processing and the background removal processing in the present exemplary embodiment will be described below with reference to FIG. 15. FIG. 15 is a flowchart illustrating the processing for setting the execution order of the monochromization processing and the background removal processing in the present exemplary embodiment.

The flowchart illustrated in FIG. 15 is achieved when the CPU 103 loads a program for executing each step of the flowchart (FIG. 15) from the storage unit 107 into the RAM (not illustrated) in the controller 100 and then executes it.

In step S301, the CPU 103 acquires the background removal level. The input image processing unit 500 acquires the background removal level corresponding to the value set in the background removal level setting screen 10 (FIG. 5). The input image processing unit 510 acquires the background removal level detected by the histogram processing unit 514.

In step S302, the CPU 103 compares the background removal level acquired in step S301 with a preset threshold value for determination. When the background removal level acquired in step S301 is less than the threshold value (YES in step S302), the processing proceeds to step S303. When the background removal level acquired in step S301 is equal to or greater than the threshold value (NO in step S302), the processing proceeds to step S308.

In step S303, the CPU 103 sets a monochromization coefficient to the monochrome image generation unit 612.

In step S304, the CPU 103 sets a processing-skip coefficient to the background removal processing unit 611. In step S304, the CPU 103 sets the background removal coefficients Rmat, Gmat, and Bmat of the background removal processing unit 611 to zero. As a result, R1 equals R2, G1 equals G2, and B1 equals B2, achieving the processing-skip setting for skipping the background removal processing.

Figure 14:
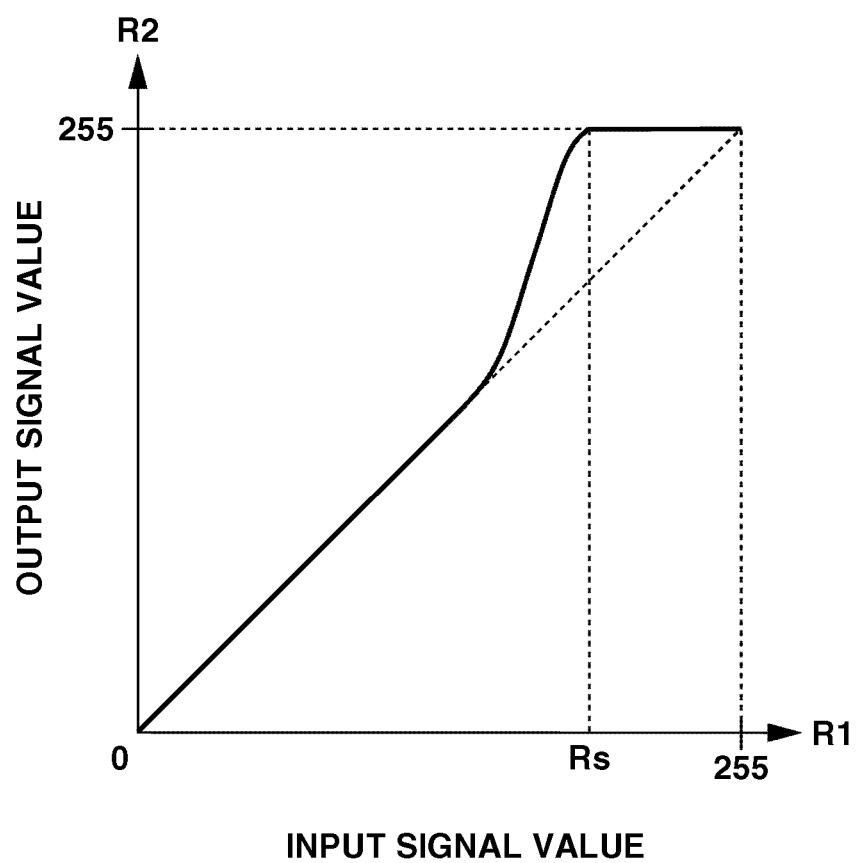
FIG. 14 illustrates an exemplary one-dimensional look-up table (LUT) for background removal according to the third exemplary embodiment of the present invention.

In step S305, the CPU 103 creates a one-dimensional LUT for background removal based on the formulas (2) and (3) for background removal. In step S305, the CPU 103 creates a LUT for nonlinear background removal, as illustrated in FIG. 14. An input signal value Rs (FIG. 14) equals the background removal level acquired in step S301 (FIG. 15). In step S305, the CPU 103 may create a LUT for linear background removal which produces a straight line within a range from (0, 0) to (Rs, 255) illustrated in FIG. 14.

Since the formula (2) uses not only R1 but also G1 and B1 to obtain R2, different values of R1, G1, and B1 produce a three-dimensional input, and therefore a one-dimensional LUT cannot be created. However, since R1=G1=B1 results for a monochrome image, the background removal processing can be applied by using the one-dimensional LUT.

In step S306, the CPU 103 combines the one-dimensional LUT created in step S305 with the one-dimensional LUT to be set to the logarithmic conversion unit 613 to create a combined one-dimensional LUT.

In step S307, the CPU 103 sets the combined one-dimensional LUT created in step S306 to the logarithmic conversion unit 613.

In step S306, the one-dimensional LUT created in step S305 may be combined with the one-dimensional LUT to be set to the gamma correction unit 614 to create a combined one-dimensional LUT. In this case, in step S307, the CPU 103 sets the combined one-dimensional LUT created in step S306 to the gamma correction unit 614.

Similar to step S303, in step S308, the CPU 103 sets the monochromization coefficient to the monochrome image generation unit 612.

In step S309, the CPU 103 sets the background removal coefficient calculated from the background removal level acquired in step S301 to the background removal processing unit 611.

This completes the explanation of the processing for the execution order switching between the monochromization processing and the background removal processing in the present exemplary embodiment.

When the input image processing unit is the input image processing unit 500 according to the first exemplary embodiment, the CPU 103 executes the flowchart illustrated in FIG. 15 to set the execution order of the monochromization processing and the background removal processing. Then, the scanner 200 scans a document image to obtain color image data, and the input image processing unit 500 processes the scanned color image data. Then, the output image processing unit 610 processes the color image data.

When the input image processing unit is the input image processing unit 510 according to the second exemplary embodiment, the CPU 103 executes the flowchart illustrated in FIG. 15 to set the execution order of the monochromization processing and the background removal processing, and then the output image processing unit 610 performs processing.

When the background removal level acquired in step S301 is equal to or greater than the luminance threshold value, the output image processing unit 610 performs relevant processing. Specifically, the background removal processing unit 611, the monochrome image generation unit 612, the logarithmic conversion unit 613, the gamma correction unit 614, and the halftone processing unit 615 perform respective processing.

When the background removal level acquired in step S301 is less than the luminance threshold value, the background removal processing unit 611 is skipped, and the monochrome image generation unit 612, the logarithmic conversion unit 613, the gamma correction unit 614, and the halftone processing unit 615 perform respective processing. When the background removal level acquired in step S301 is less than the luminance threshold value, the logarithmic conversion unit 613 performs logarithmic conversion processing by using the combined one-dimensional LUT set in step S307 (FIG. 15).

In the present exemplary embodiment, when the monochromization processing is applied before the background removal processing, the background removal processing is performed simultaneously with the logarithmic conversion processing, eliminating the need of providing a plurality of monochrome image generation units or background removal processing units. Thus, the execution order of the monochromization processing and the background removal processing can be changed with a simple configuration.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2010-226583 filed Oct. 6, 2010 and No. 2011-171975 filed Aug. 5, 2011, which are hereby incorporated by reference herein in their entirety.

What is claimed is:

1. An image processing apparatus comprising:
   a monochrome image data generation unit configured to generate monochrome image data based on color image data;
   a background removal processing unit configured to apply background removal processing to the color image data based on a background removal level; and
   a control unit configured to, according to the background removal level, control switching between applying the background removal processing by the background removal processing unit to the monochrome image data generated by the monochrome image data generation unit and generating monochrome image data by the monochrome image data generation unit based on the image data having undergone the background removal processing for the color image data by the background removal processing unit.

2. The image processing apparatus according to claim 1, further comprising:
   a creation unit configured to create a histogram regarding a brightness of the color image data; and
   a detection unit configured to detect a background removal level of the color image data based on the histogram created by the creation unit.

3. The image processing apparatus according to claim 1, wherein the background removal level is input via an operation unit.

4. An image processing apparatus comprising:
   an acquisition unit configured to acquire color image data; and
   a first processing unit configured to, in a case where a background removal level is a level for removing a background, generate monochrome image data based on the color image data and then apply background removal processing to the generated monochrome image data according to the background removal level, and configured to, in a case where the background removal level is a level for not removing the background, apply the background removal processing to the color image data according to the background removal level and then generate monochrome image data based on the image data having undergone the background removal processing for the color image data.

5. An image processing apparatus comprising:
- an acquisition unit configured to acquire color image data; and
- a second processing unit configured to, in a case where a background removal level is less than a predetermined threshold value, generate monochrome image data based on the color image data and then apply background removal processing to the generated monochrome image data according to the background removal level, and configured to, in a case where the background removal level is equal to or greater than the predetermined threshold value, apply the background removal processing to the color image data according to the background removal level and then generate monochrome image data based on the image data having undergone the background removal processing for the color image data.

6. The image processing apparatus according to claim 5, wherein the predetermined threshold value is a luminance threshold value.

7. The image processing apparatus according to claim 5, further comprising:
- a determination unit configured to determine whether the background removal level of the image data is less than the predetermined threshold value;
- a generation unit configured to, in a case where the background removal level is determined to be less than the threshold value, generate a look-up table for applying the background removal processing; and
- a combining unit configured to combine the look-up table generated by the generation unit with a look-up table for converting the luminance to the density to form a combined look-up table,
- wherein, in a case where the background removal level is less than the threshold value, the second processing unit applies the background removal processing to the monochrome image data generated based on the image data by using the combined look-up table formed by the combining unit.

8. An image processing method comprising:
- generating monochrome image data based on a color image data;
- applying background removal processing to the color image data based on a background removal level; and
- controlling switching, according to the background removal level, between applying the background removal processing to the generated monochrome image data and generating monochrome image data based on the image data having undergone the background removal processing for the color image data.

9. A non-transitory computer-readable storage medium storing a program for causing a computer to execute the image processing method according to claim 8.

10. An image processing method comprising:
- acquiring color image data; and
- generating, in a case where a background removal level is a level for removing a background, monochrome image data based on the color image data and then applying background removal processing to the generated monochrome image data according to the background removal level, and applying, in a case where the background removal level is a level for not removing the background, the background removal processing to the color image data according to the background removal level and then generating monochrome image data based on the image data having undergone the background removal processing for the color image data.

11. A non-transitory computer-readable storage medium storing a program for causing a computer to execute the image processing method according to claim 10.

12. An image processing method comprising:
- acquiring color image data; and
- generating, in a case where a background removal level is less than a predetermined threshold value, monochrome image data based on the color image data and then applying background removal processing to the generated monochrome image data according to the background removal level, and applying, in a case where the background removal level of the color image data is equal to or greater than the predetermined threshold value, the background removal processing to the color image data according to the background removal level and then generating monochrome image data based on the image data having undergone the background removal processing for the color image data.

13. A non-transitory computer-readable storage medium storing a program for causing a computer to execute the image processing method according to claim 12.

* * * * *